United States Patent
Dowling

(10) Patent No.: US 8,540,071 B2
(45) Date of Patent: Sep. 24, 2013

(54) CONVEYOR ROLLER SUPPORT ARRANGEMENT

(76) Inventor: John Dowling, Brakpan (ZA)

(*) Notice: Subject to any disclaimer, the term of this patent is extended or adjusted under 35 U.S.C. 154(b) by 0 days.

(21) Appl. No.: 13/439,090

(22) Filed: Apr. 4, 2012

(65) Prior Publication Data

US 2013/0140144 A1    Jun. 6, 2013

(51) Int. Cl.
*B65G 21/08*    (2006.01)

(52) U.S. Cl.
USPC ................. 198/861.1; 198/782; 193/35 R

(58) Field of Classification Search
USPC ......... 198/860.1, 861.1, 780, 782; 193/35 R, 193/37
See application file for complete search history.

(56) References Cited

U.S. PATENT DOCUMENTS

| | | | | |
|---|---|---|---|---|
| 4,053,039 | A * | 10/1977 | Shuttleworth | 193/35 R |
| 5,657,854 | A * | 8/1997 | Chen et al. | 198/787 |
| 6,942,085 | B1 * | 9/2005 | Tatz | 193/35 R |
| 7,228,952 | B2 * | 6/2007 | Kanaris | 193/37 |
| 7,370,747 | B2 * | 5/2008 | Ruiz | 193/35 R |
| 7,588,135 | B1 * | 9/2009 | Chuang | 193/35 R |
| 2002/0092726 | A1 * | 7/2002 | Kiviranta et al. | 193/37 |

* cited by examiner

*Primary Examiner* — James R Bidwell
(74) *Attorney, Agent, or Firm* — Thomas | Horstemeyer, LLP

(57) ABSTRACT

A conveyor roller support arrangement includes a frame having a pair of opposed end-frames, each end-frame including a mounting support for mounting a respective end of a conveyor roller, wherein at least one of the mounting supports is displaceable relative to the frame between an operative position in which the roller is mounted for rotation and a removable position in which the roller is free for removal from the frame.

20 Claims, 4 Drawing Sheets

CONVEYOR ROLLER SUPPORT ARRANGEMENT

CROSS-REFERENCE TO RELATED APPLICATION

This application claims priority to copendinq South African application entitled, "Conveyor Roller Support Arrangements" having application no. 2011/08941, filed Dec. 6, 2011, which is entirely incorporated herein by reference.

FIELD OF THE INVENTION

The invention relates to conveyors. More particularly, the invention relates to a conveyor roller support arrangement. In particular, the invention relates to a conveyor roller support arrangement configured to facilitate the removal of a return roller.

BACKGROUND TO THE INVENTION

Conveyors are commonly used to transport material from one location to another. There are various types, sizes and uses of conveyors and they are commonly used in industries where heavy material requires transporting. Certain commonly used conveyors employ a roller and belt mechanism in which material is transported along a moving belt, which is supported and driven by means of a roller system. The rollers of belt conveyors frequently require removal from the conveyor system to enable repair, replacement and maintenance. It is therefore necessary to be able to remove the roller from the conveyor system. However, access to the rollers of a belt conveyor may be difficult, either because of the environment in which the conveyor is used or the orientation of the conveyor. For example, belt conveyors often have steep inclines and are raised high off the ground or other substrate. Thus, the removal of a roller from the conveyor roller support system is not always an easy task. Generally, the removal of the roller from the conveyor system requires more than one person to perform the task, owing to the size and weight of the roller. The rollers are commonly removed by manually lifting the roller out of the support structure from below, during which process, the roller must be supported either manually or by using some form of jack or cradle. In addition, the belt must be supported to facilitate removal of the roller and while the roller is being replaced.

It would therefore be an advantage to provide a mechanism that would facilitate the removal of a roller from a belt conveyor and it would be advantageous if this could be done by a single person with little or no risk of injury.

Another difficulty in removing a roller from a conveyor arrangement is that many large conveyors are only accessible from one side of the conveyor. Conveyors generally include a walkway on one side of the conveyor. The opposite side of the conveyor often has the drive train for the conveyor and this side is generally not readily accessible to persons. Accordingly it would be an advantage to provide a mechanism or system that would enable a roller of the conveyor to be removed from one side of the conveyor system. It will be appreciated that it would be an advantage to be able to remove the roller from the walkway side of the conveyor system.

The present invention is directed to so-called "return rollers" or "idler rollers, which are not driven and generally support the return portion of a continuous belt loop that is located below the material-carrying portion of the belt loop. The rollers supporting the material-carrying portion of the belt loop may be driven rollers or idler rollers.

OBJECT OF THE INVENTION

It is an object of this invention to provide a conveyor roller support arrangement to alleviate, at least in part, some of the problems and achieve the advantages highlighted above.

SUMMARY OF THE INVENTION

According to this invention there is provided a conveyor roller support arrangement including a frame having a pair of opposed end-frames, each end-frame including a mounting means for mounting a respective end of a conveyor roller, wherein at least one of the mounting means is displaceable relative to the frame between an operative position in which the roller is mounted for rotation and a removable position in which the roller is free for removal from the frame.

The, or each, mounting means may be removably mounted on its associated end-frame.

The frame may include a locking means for releasably locking the mounting means in its operative position.

The, or each, mounting means may comprise a mounting beam. The mounting beam may include a recess for receiving an axle of a roller for rotation. Ends of the mounting beam may be received within slots defined in the end frame so that the beam is operable for lateral displacement within the slots to displace it from its operable to its removable position.

The locking means may comprise at least one locking recess defined in an operatively lower edge of the support beam, the, or each locking recess being respectively engageable with a boss arranged on a respective end-frame. In one embodiment of the invention, the locking means comprises a series of locking recesses spaced longitudinally on the support beam, to enable the support beam to be used to control the orientation of the rotation axis of a roller supported by the support arrangement, thereby to assist in the control of the tracking and alignment of a conveyor belt supported by the support arrangement. In another embodiment of the invention, the locking recesses vary progressively in depth, to enable the support beam to be used to control the orientation in two planes of the rotation axis of a roller supported by the support arrangement, thereby to assist in the control of the tracking and alignment of a conveyor belt supported by the support arrangement.

The conveyor roller support arrangement may further include support means for supporting a roller when free for removal from the frame of the support arrangement.

In one embodiment of the invention, the support means includes a jack-mounted cradle. The support means may include a further fixedly mounted cradle spaced laterally with respect to the frame from the jack-mounted cradle. The conveyor roller support arrangement may include a lateral guide means, with which the support means is slidably engaged for lateral displacement with respect to the frame of the support arrangement. The support means may be removable from the frame of the support arrangement.

The conveyor roller support arrangement may include a belt-lifting means for lifting a conveyor belt clear of a roller to be removed. The belt-lifting means may be removably mounted on the frame of the support arrangement. In one embodiment of the invention, the belt-lifting means comprises a parallel beams pivotally connected to each other by cross members such that they are operable, while remaining parallel, to be spaced more or less closely to each other, in a parallel rule-like manner.

BRIEF DESCRIPTION OF THE DRAWINGS

The invention is not described, by way of example, with reference to the following diagrammatic drawings. In the drawings.

DETAILED DESCRIPTION OF THE DRAWINGS

Figure 1:
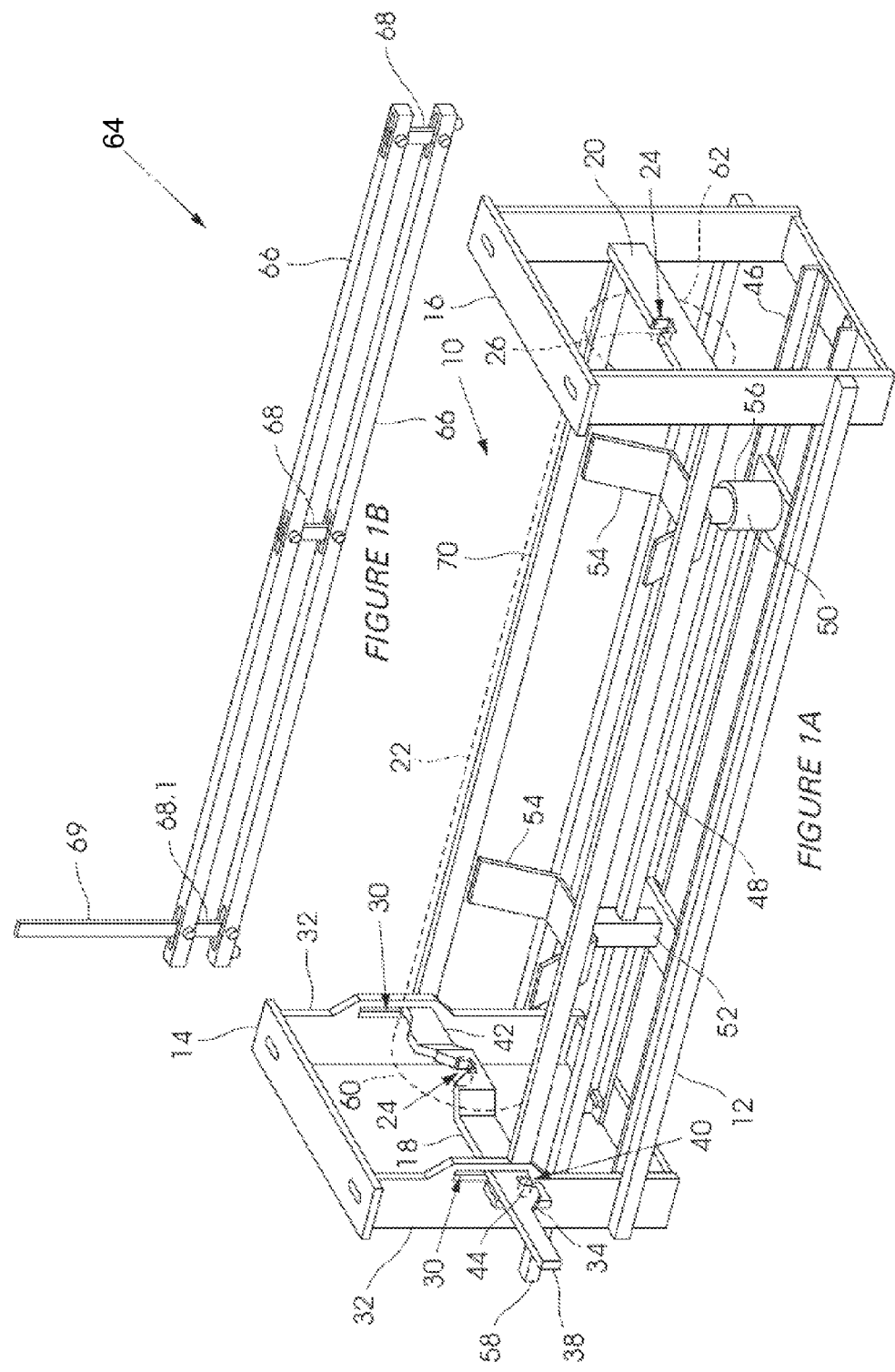
FIG. 1A shows a perspective view of a conveyor roller support system in accordance with the invention.
FIG. 1B shows the perspective view of a belt-lifting device for the support arrangement in accordance with the invention.
Figure 2:
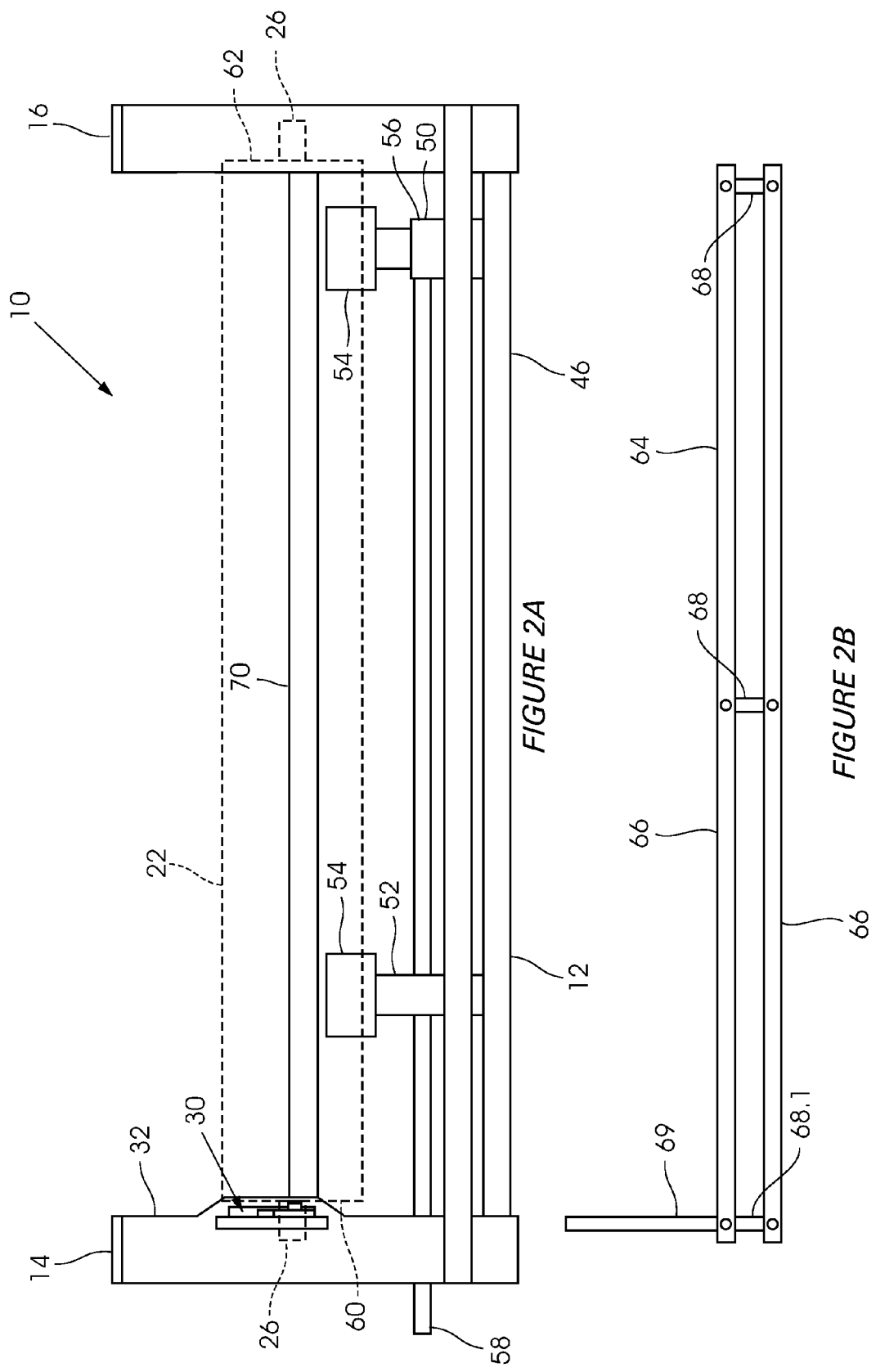
FIG. 2A shows a side view of the support system of FIG. 1A.
FIG. 2B shows a side view of the belt-lifting device of FIG. 1B.

In the drawings, reference numeral (10) generally refers to the conveyor roller support arrangement in accordance with the invention.

Figure 3:
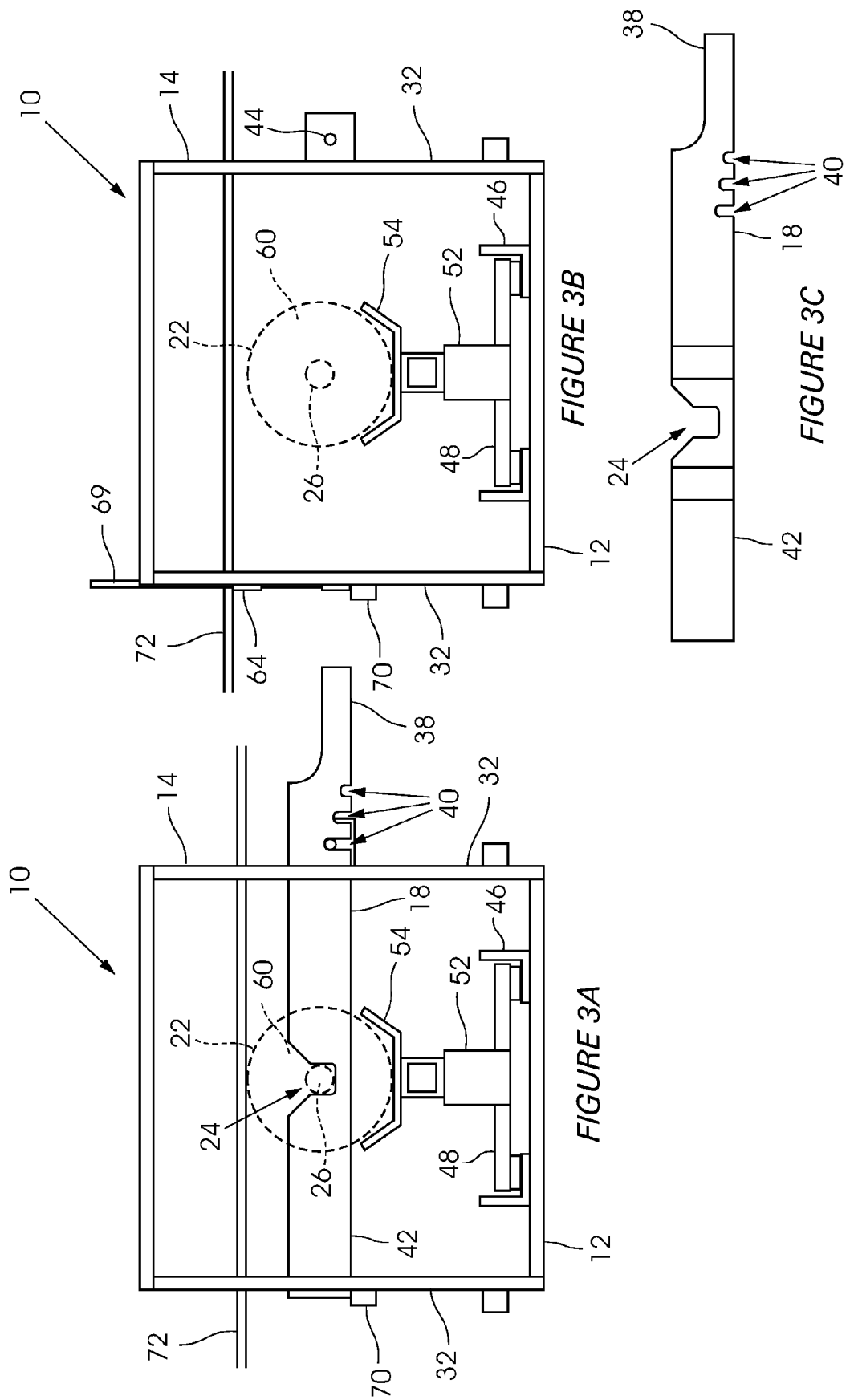
FIG. 3A shows an end view of the support system of FIG. 1A from its proximal end.
FIG. 3B shows the end view of the support system of FIG. 3A with the roller support beam removed.
FIG. 3C shows a side view of a further embodiment of the removable roller support beam of the support arrangement.
Figure 4:
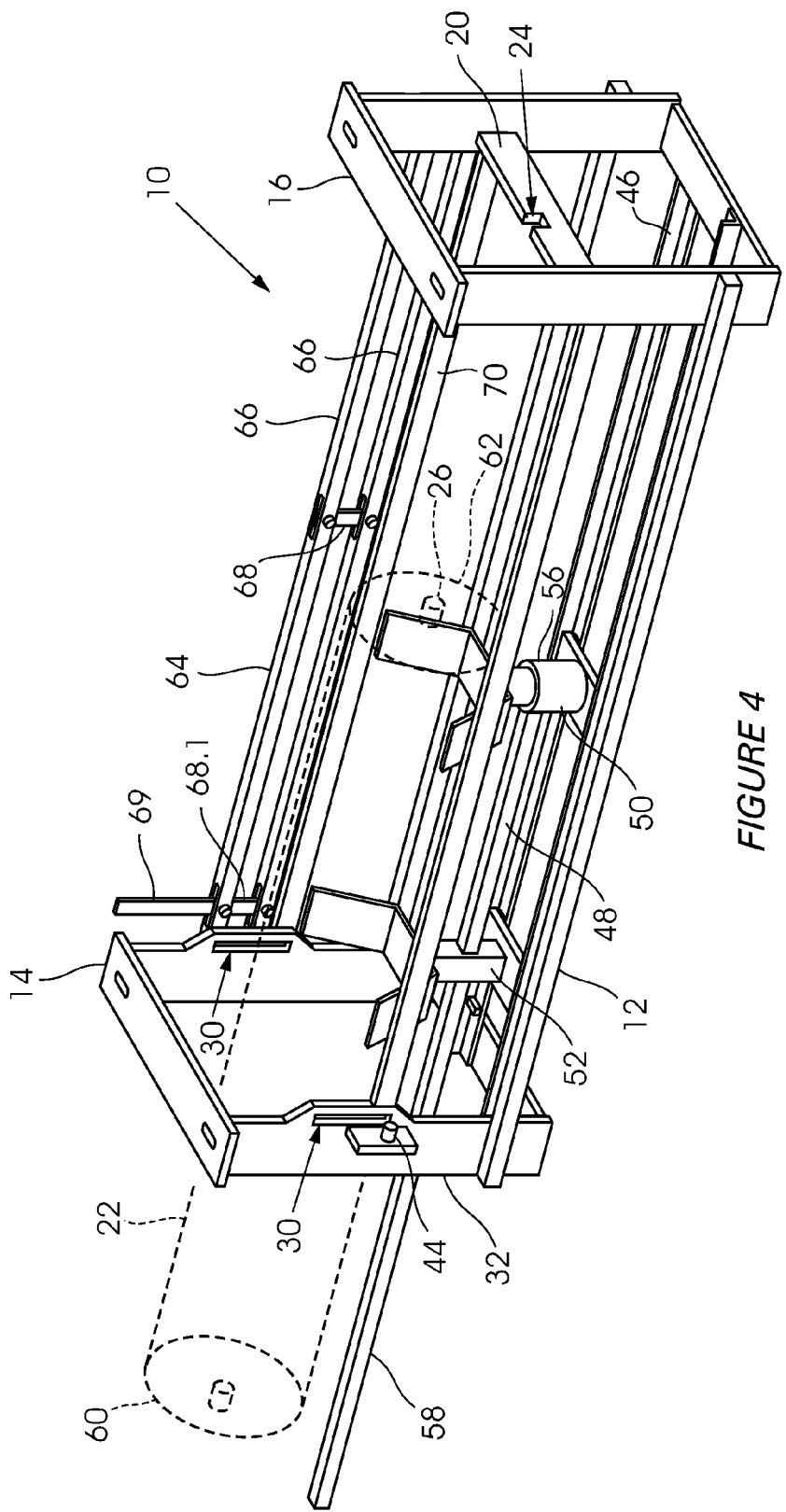
FIG. 4 shows a perspective view of the support system of FIG. 1A, in the process of removing its roller for maintenance.

The support arrangement (10) has a frame (12) which has two opposing end sub-frames (14,16), each capable of being fixed to a substrate or to a larger conveyor framework (not shown). Each end sub-frame (14,16) includes a support beam (18,20) for supporting a return roller (22) of a belt conveyor. Each support beam (18,20) has a slot (24) for receiving a stub-axle (26) extending from an end of the roller (22) and connected to the roller (22) via a bearing assembly (not shown). Thus, when the roller (22) is mounted on the support beams (18,20) in normal operation, it is operable to rotate freely with the movement of the conveyor belt (72) (as shown in FIGS. 3A and 3B) that is supported by the roller (22) and similar rollers.

In use, one end sub-frame (14) of the frame (12) is positioned proximate a walkway (not shown) of the conveyor system, while the opposed second end sub-frame (16) is distal from the walkway. The support beam (18) on the end sub-frame (14) is removably mounted on the end sub-frame (14) via a pair of elongate slots (30) defined in upright frame-elements (32), ends (34,36) of the support beam (18) being slidably received within respective slots (30). An extension of the support beam (18) extending from the end (34) provides a handle (38) for manipulating the support beam (18). The support beam, (18) further has a locking recess (40) defined in its operatively lower edge (42) and the locking recess (40) is configured to engage a protruding boss (44) mounted on the end sub-frame (14). In use, when it is desired to remove the return roller (22) for maintenance, the support beam (18) is lifted off the boss (44), and the return roller (22) is supported elsewhere, as will be described below, allowing the support beam (18) to be partially or fully withdrawn from the end sub-frame (14) by sliding it laterally through the slots (30). The procedure is reversed once the return roller (22) has been repaired.

The frame (12) has a lateral guide channel (46), which extends from the walkway end sub-frame (14) of the frame (12) to the drive side end sub-frame (16). The guide channel (46) is adapted to receive a roller support device (48) and to permit the support device (48) to be displaced slidingly, laterally along the guide channel (46). The support device (48) comprises a pair of spaced apart interconnected supports (50,52), each having a cradle (54) adapted to the shape of the roller (22) so that the roller (22) can be conveniently supported at two positions for removal and replacement. One of the supports (50) is remotely adjustable in height by means of a hydraulic jack (56), a hydraulic control line (not shown) of which extends to the end sub-frame (14) proximal the walkway, so that the jack (56) may be actuated from the walkway side of the conveyor (It will be appreciated that both supports may be so adjustable, if required). A manipulating arm (58) extends from the support device (48) towards the end sub-frame (14) proximal the walkway, so that the entire support device (48) may be manipulated from that side of the conveyor.

In use, the support device (48) engages with the guide channel (46) and the longitudinal arm (58) is used to slide the entire support device (48) towards the drive side sub-frame (16). The support (52) is set at a height above that of the operating height of the roller (22) at its lower extremity, so that the proximal end (60) of the roller (22) must be lifted by means of the support beam (18) in order for the support device (48) to be slid under the roller (22). Once the support device (48) is in place, the roller (22) may be lowered so that it is supported near its proximal end (60) by the cradle (54) of the fixed support (52). At this stage, the support (50) is set at a height below the lower extremity of the roller (22). Once the roller (22) is supported on the support (52), the jack (56) is activated to lift the distal end (62) of the roller (22) from its support beam (20) and to support the distal end (62) of the roller (22). The support device (48) may include further supports (not shown), as desired, and these may be adjustable or fixed supports.

The support arrangement (10) may also include or be used in conjunction with a belt-lifting device (64). This device is designed to assist in lifting a conveyor belt (72) (shown in FIGS. 3A and 3B), which is supported on the roller(s) (22), prior to removing the roller (22) from the conveyor roller support arrangement (10). The belt-lifting device (64) includes two parallel interconnected beams (66). The beams (66) are pivotally interconnected by means of cross-members (68), one of which (68.1) has an extension that provides a handle (69) and acts as a lever that is operable between a first position, in which the two beams (66) abut one another, and a second position, in which the two beams (66) are spaced apart, but remain parallel with one another, in a fashion similar to that of a parallel rule as used by navigators. The entire belt-lifting device (64) is supported on a cross-member (70) of the support arrangement (10) and is removable. In use, the belt-lifting device (64) is set in place parallel to the roller (22) to be removed and the lever (68.1) is actuated from the walkway end sub-frame (14) to lift the conveyor belt (72), which may be relatively heavy, clear of the roller (22) while it is removed and replaced.

FIG. 3C shows a further embodiment of the support beam (18), which differs from that illustrated in the previous drawings in that it has three longitudinally spaced locking recesses (40). The recesses (40) also vary progressively in depth from the shallowest recess (40), which is closest to the handle (38). It will be appreciated that the use of these locking recesses enables the support beam (18) to be used to control the angle of the rotation axis of the roller (22) in two planes, thereby to assist in the control of the tracking and alignment of the conveyor belt (72).

By means of this invention, there is provided a device that will facilitate the maintenance of conveyor systems. The support arrangement (10) of the invention, is operable from one side of a conveyor system without the necessity of engineers having to place themselves in potentially dangerous and difficult to access situations below an operating belt conveyor.

The invention claimed is:

1. A conveyor roller support arrangement comprising:
a pair of opposed end-frames within a frame, each of the pair of opposed end-frames comprising a support beam configured to mount a respective end of a conveyor roller wherein ends of at least one of the support beams are received within a plurality of slots defined in at least one of the pair of opposed end-frames so that the respective support beam is operable for lateral displacement within the plurality of slots to displace the respective support beam from an operative position in which the conveyor roller is mounted for rotation to a removable position in which the conveyor roller is free for removal from the frame;
a locking means for releasably locking at least one of the support beams in the operative position; and
wherein at least one of the support beams is displaceable relative to the frame between the operative position and the removable position.

2. The conveyor roller support arrangement as claimed in claim 1, in which each of the support beams comprises a recess for receiving an axle of the conveyor roller for rotation.

3. The conveyor roller support arrangement as claimed in claim 2, in which the locking means comprises an at least one locking recess positioned in an operatively lower edge of at least one of the support beams, the respective locking recess being engageable with a boss arranged on at least one of the pair of opposed end-frames.

4. The conveyor roller support arrangement as claimed in claim 3, in which the locking means comprises a series of locking recesses spaced longitudinally on at least one of the support beams to enable the respective support beam to be used to control the an orientation of a rotation axis of the conveyor roller supported by the conveyor roller support arrangement, thereby to assist in a control of a tracking and an alignment of a conveyor belt supported by the conveyor roller support arrangement.

5. The conveyor roller support arrangement as claimed in claim 4, in which the series of locking recesses vary progressively in depth, to enable at least one of the support beams to be used to control the orientation in two planes of the rotation axis of the conveyor roller supported by the conveyor roller support arrangement, thereby to assist in the control of the tracking and the alignment of the conveyor belt supported by the conveyor roller support arrangement.

6. The conveyor roller support arrangement as claimed in claim 1, further comprising a support device configured to support the conveyor roller when free for removal from the frame comprising a jack-mounted cradle.

7. The conveyor roller support arrangement as claimed in claim 1, further comprising a belt-lifting device configured to lift a conveyor belt clear of the conveyor roller removably mounted on the frame.

8. A conveyor roller support arrangement comprising:
a pair of opposed end-frames within a frame, each of the pair of opposed end-frames comprising a support beam configured to mount a respective end of a conveyor roller;
a support device configured to support the conveyor roller when free for removal from the frame comprising a jack-mounted cradle; and
wherein at least one of the support beams is displaceable relative to the frame between an operative position in which the conveyor roller is mounted for rotation and a removable position in which the conveyor roller is free for removal from the frame.

9. The conveyor roller support arrangement as claimed in claim 8, in which the support device further comprises a fixedly mounted cradle spaced laterally with respect to the frame from the jack-mounted cradle.

10. The conveyor roller support arrangement as claimed in claim 9, further comprising a lateral guide channel with which the support device is slidably engaged for lateral displacement with respect to the frame.

11. The conveyor roller support arrangement as claimed in claim 10, in which the support device is removable from the frame.

12. The conveyor roller support arrangement as claimed in claim 8, further comprising a locking means for releasably locking at least one of the support beams in the operative position.

13. The conveyor roller support arrangement as claimed in claim 12, in which the locking means comprises an at least one locking recess positioned in an operatively lower edge of the respective support beam, the respective locking recess being engageable with a boss arranged on at least one of the pair of opposed end-frames.

14. The conveyor roller support arrangement as claimed in claim 8, wherein ends of at least one of the support beams are received within a plurality of slots defined in at least one of the pair of opposed end-frames so that the respective support beam is operable for lateral displacement within the plurality of slots to displace the respective support beam from the operative position to the removable position.

15. The conveyor roller support arrangement as claimed in claim 14, in which each of the support beams comprises a recess for receiving an axle of the conveyor roller for rotation.

16. A conveyor roller support arrangement comprising:
a pair of opposed end-frames within a frame, each of the pair of opposed end-frames comprising a support beam configured to mount a respective end of a conveyor roller;
a belt-lifting device removably mounted on the frame configured to lift a conveyor belt clear of the conveyor roller; and
wherein at least one of the support beams is displaceable relative to the frame between an operative position in which the conveyor roller is mounted for rotation and a removable position in which the conveyor roller is free for removal from the frame.

17. The conveyor roller support arrangement as claimed in claim 16, in which the belt-lifting device comprises a plurality of parallel beams pivotally connected to each other by a plurality of cross members such that the plurality of parallel beams are operable, while remaining parallel, to be spaced more or less closely to each other, in a parallel rule-like manner.

18. The conveyor roller support arrangement as claimed in claim 16, further comprising a locking means for releasably locking at least one of the support beams in the operative position.

19. The conveyor roller support arrangement as claimed in claim 16, wherein ends of at least one of the support beams are received within a plurality of slots defined in at least one of the pair of opposed end-frames so that the respective support beam is operable for lateral displacement within the plurality of slots to displace the respective support beam from the operative position to the removable position.

20. The conveyor roller support arrangement as claimed in claim 19, in which each of the support beams comprises a recess for receiving an axle of the conveyor roller for rotation.

\* \* \* \* \*